US005117224A

United States Patent [19]

Kawamura et al.

[11] Patent Number: 5,117,224

[45] Date of Patent: May 26, 1992

[54] COLOR LIQUID CRYSTAL DISPLAY APPARATUS

[75] Inventors: Masao Kawamura, Fuchu; Ken Yoshino, Koganei, both of Japan

[73] Assignee: Casio Computer, Ltd., Tokyo, Japan

[21] Appl. No.: 310,321

[22] Filed: Feb. 13, 1989

[30] Foreign Application Priority Data

Feb. 16, 1988 [JP] Japan ........................ 63-31959
Dec. 7, 1988 [JP] Japan ........................ 63-309194

[51] Int. Cl.[5] .................. G09G 1/28; G02F 1/13

[52] U.S. Cl. .................... 340/703; 340/702; 340/784; 340/765; 359/55; 359/68

[58] Field of Search ............ 340/784, 702, 703, 765, 340/705, 711, 805; 350/339 F, 336, 337, 331 T; 358/236

[56] References Cited

U.S. PATENT DOCUMENTS

| | | | |
|---|---|---|---|
| 3,907,405 | 9/1975 | Fukai et al. | 350/331 T |
| 3,921,162 | 11/1975 | Fukai et al. | 350/331 T |
| 3,976,362 | 8/1976 | Kawakami | 340/784 |
| 4,119,367 | 10/1978 | Raynes et al. | 340/784 |
| 4,242,679 | 12/1980 | Morozumi et al. | 340/765 |
| 4,462,027 | 7/1984 | Lloyd | 340/784 |
| 4,604,617 | 8/1986 | Morozumi | 340/805 |
| 4,632,514 | 12/1986 | Ogawa et al. | 350/339 F |
| 4,656,470 | 4/1987 | Saka | 340/765 |
| 4,679,043 | 7/1987 | Morokawa | 340/784 |
| 4,724,433 | 2/1988 | Inoue et al. | 340/784 |
| 4,801,933 | 1/1989 | Yamamoto et al. | 340/702 |
| 4,917,469 | 4/1990 | Ross | 340/805 |

FOREIGN PATENT DOCUMENTS

| | | |
|---|---|---|
| 0217337 | 10/1985 | Japan . |
| 0104021 | 5/1988 | Japan . |
| 0200122 | 8/1988 | Japan . |

OTHER PUBLICATIONS

Electronic Letters, A Novel Method of Temperature Compensation For Multiplexed Liquid Crystal Displays, vol. 14, Jul. 6, 1978, pp. 430–432.

*Primary Examiner*—Jeffery A. Brier
*Assistant Examiner*—Chanh Nguyen
*Attorney, Agent, or Firm*—Frishauf, Holtz, Goodman & Woodward

[57] ABSTRACT

In driving a color liquid crystal panel having red, green and blue color filters, a color liquid crystal display apparatus sets signal electrodes of these three colors in a no-bias status during a non-display period of an image signal in such a manner as to permit at least two colors of the signal electrodes have mutually different effective voltages. The effective voltages in the no-bias state are set at values which provide the optimum value for Δn·d (Δn: birefringence) in accordance with cell gaps d on the signal electrodes, thereby minimizing the height difference between the color filters.

18 Claims, 16 Drawing Sheets (a)

V2

| EC̄ \ φ̄f | L | H |
|---|---|---|
| L | Vb | -Vb |
| H | GND | GND |

(b)

COLOR LIQUID CRYSTAL DISPLAY APPARATUS

BACKGROUND OF THE INVENTION

1. Field of the Invention

The present invention relates to a liquid crystal display panel driving apparatus for driving a color liquid crystal panel having color filters provided between scan electrodes and signal electrodes.

2. Description of the Related Art

A color liquid crystal panel for use in liquid crystal color televisions, etc. displays an image in full color by a combination of red (R), green (G) and blue (B) pixels. In displaying a color image by a combination of red, green and blue pixels, display of a full color image with high reproducibility requires that the luminances of these three types of pixels be balanced. Due to the wavelength dependency of a liquid crystal element, however, this property influences the color reproducibility of display pixels. This short-coming is more prominent for a color liquid crystal display element having its view angle characteristic improved by reducing the cell gap (the thickness of a liquid crystal layer).

In other words, to improve the view angle characteristic of a liquid crystal display element, the value of the liquid crystal element, Δn·d (Δn: birefringence and d: cell gap) should be set small. This is because a liquid crystal element having a large Δn·d has a large change in this value depending on the view angle (viewing direction). Since the value of Δn·d greatly changes depending on the view angle means that a large change in contrast occurs depending on the view angle. Therefore, the change in contrast which is depended on the view angle can be reduced by setting the cell gap of the liquid crystal element small to thereby make Δn·d small. According to the color liquid crystal element, however, reduction in Δn·d increases the wavelength dependency of transmitted light, as shown in FIG. 1. FIG. 1 illustrates the relation between Δn·d (μm) and an amount of transmitted light (%), where "R" is a characteristic of 650-nm (red) wavelength light, "G" is a characteristic of 550-nm (green) wavelength light, and "B" is a characteristic of a 450-nm (blue) wavelength light. The presence of the aforesaid "wavelength dependency" means that the light transmittivity varies from one wavelength to another and that, in view of three-color (R, G and B) lights, the lights with different wavelengths which pass the respective filters have different intensities. This is because that the characteristic showing a change in transmittivity with respect to Δn·d differs from one light having a specific wavelength to one of the three colors to another; the greater the wavelength dependency of transmitted light, the lower the color reproducibility of a displayed image.

As a conventional solution to the above short-coming, the thicknesses of the individual color filters FR, FG and FB are set different from one another to adjust the cell gaps dR, dG and dB for pixel display sections for these colors, as shown in FIG. 2, whereby the transmittivities of the individual color lights are balanced by changing the values of Δn·d of the individual pixel display sections. FIG. 2 illustrates the cross section of the configuration of a color liquid crystal display element. Referring to this diagram, reference numerals 1 and 2 denote a pair of upper and lower transparent substrates (glass plates) facing each other with a liquid crystal layer 3 in between, and these substrates are adhered through a frame-shaped seal member (not shown). A number of parallel transparent scan electrodes 4 are arranged in stripe form on the inner wall of the upper substrate 1 (which faces the lower substrate 2) in the horizontal direction in the diagram. A number of parallel transparent R, G and B signal electrodes 5*a*, 5*b* and 5*c* are arranged on the inner wall of the lower substrate 1 (which faces the upper substrate 1) in such a direction as to cross the scan electrodes 4. These signal electrodes 5*a*–5*c* are respectively provided on the striped color filters FR, FG and FB, which are provided on the surface of the lower substrate 2 in such a way as to cross and face the individual scan electrodes on the upper substrate 1. FR is a red filter, FG a green filter, and FB a blue filter, and these color filters FR, FG and FB are alternately arranged, as illustrated in FIG. 2. The color filters FR, FG and FB have their surfaces covered with a transparent insulative film 6 on which the signal electrodes 5*a*, 5*b* and 5*c* are formed. The end portions of the scan electrodes 4 and signal electrodes 5*a*, 5*b* and 5*c* are extracted as driver connection terminals to side edge portions of the substrates, as shown in FIG. 3. The scan electrodes 4 are supplied with scan signals X1, X2, . . . , and the signal electrodes 5*a*, 5*b* and 5*c* are supplied with R, G and B image signals in association with the respective color filters FR, FG and FB. Referring to FIG. 2, reference numerals *7a* and *7b* are orientation process films provided on the electrode-forming surfaces of the substrates 1 and 2, and 8*a* and 8*b* are deflection plates.

With the above arrangement, a full color image with a high reproducibility can be displayed with balanced luminances of the red, green and blue pixels by changing the thicknesses of the individual filters FR, FG and FB to balance their transmittivities. In this case, with the same Δn·d for the individual pixel display sections, the red light has the highest transmittivity among the three color lights, and the green light has the second highest transmittivity, with the blue light having the lowest one. To balance the transmittivities of the individual color lights, therefore, the red filter FR for passing red light having the highest transmittivity is made thinnest, the green filter FG thicker and the blue filter FB thickest, as shown in FIG. 2. In general, therefore, there is a height difference of about 1 μm between the red filter FR and green filter FG and about 2 μm between the red filter FR and blue filter FB.

As described above, the conventional liquid crystal display element has a large height difference between the red filter FR and blue filter FB, so that the orientation process films *7a* and *7b* and transparent insulative film 6 may not be formed evenly or the insulative film 6 is more likely to be cut by the etching process for forming the transparent electrodes 4.

SUMMARY OF THE INVENTION

Accordingly, it is an object of this invention to provide a liquid crystal panel driver which can surely drive a color liquid crystal panel for image display without deteriorating the balanced light transmittivities even when a height difference between the color filters is made small, and can reduce the number of occurrence of defects.

To achieve the object, there is provide a color liquid crystal display apparatus comprising:

color liquid crystal display means, having a plurality of common electrodes, a plurality of segment electrodes crossing said plurality of common electrodes and filters of three primary colors, for display a color image by means of a plurality of pixels through said filters; and drive means for driving said segment electrodes in a gradation according to an image signal, driving said common electrodes by a scan signal, and driving said segment electrodes in such a way as to provide a no-bias (zero-bias) period in which a voltage of said common electrodes is set equal to that of said segment electrodes to provide no-bias and which is for setting effective drive voltages of at least two of three types of pixels through said primary color filters different from each other during a non-display period of said image signal.

According to this invention, the height difference between the individual color filters can be made smaller without deteriorating the light transmittivity and the number of occurrence of defects can be significantly reduced.

BRIEF DESCRIPTION OF THE DRAWINGS

FIGS. 4 through 9 illustrate the first embodiment of this invention in which

FIG. 4 is a block diagram illustrating the general circuit configuration;

FIG. 5 is a detailed circuit diagram of a data controller;

FIG. 6 is a detailed block diagram of a segment driver;

FIG. 7 is a detailed circuit diagram of segment drive voltage generator of a liquid crystal drive voltage generator;

FIGS. 13 through 18G illustrate the third embodiment of this invention in which FIG. 13 is a block diagram illustrating the general circuit configuration;

FIG. 14 is a detailed circuit diagram of a data controller;

FIG. 15 is a detailed block diagram of a segment driver;

FIG. 16(*a*) is a detailed circuit diagram of segment drive voltage generator of a liquid crystal drive voltage generator;

FIG. 16(*b*) is a diagram for explaining a voltage generating operation; and

FIGS. 17A to 17K and 18A to 18G are timing charts for explaining the operation of the third embodiment.

DETAILED DESCRIPTION OF THE PREFERRED EMBODIMENT

Figure 1:
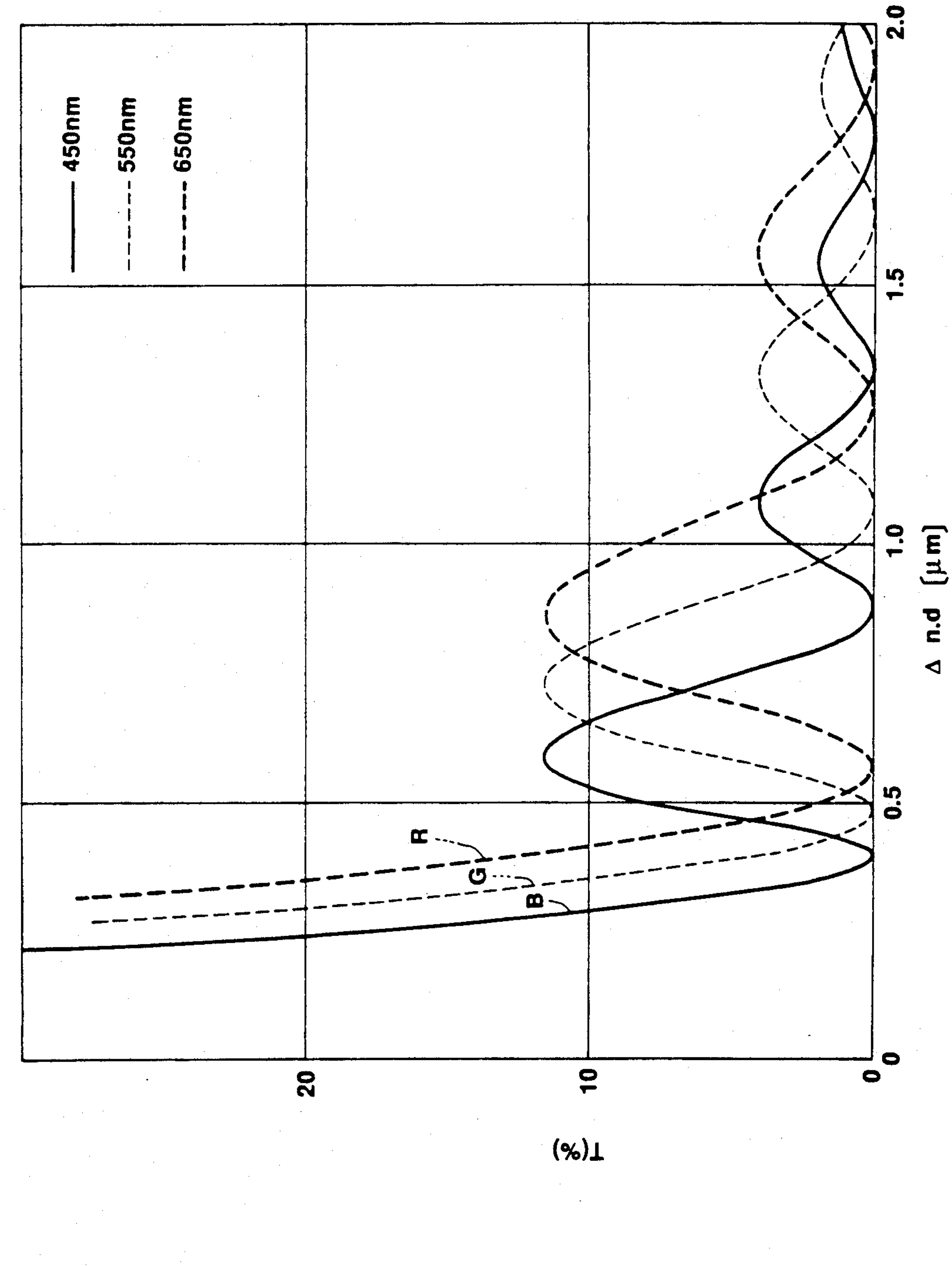
FIG. 1 is a characteristic diagram illustrating the relation between Δn·d of a liquid crystal element and the amount of transmitted light.
Figure 2:
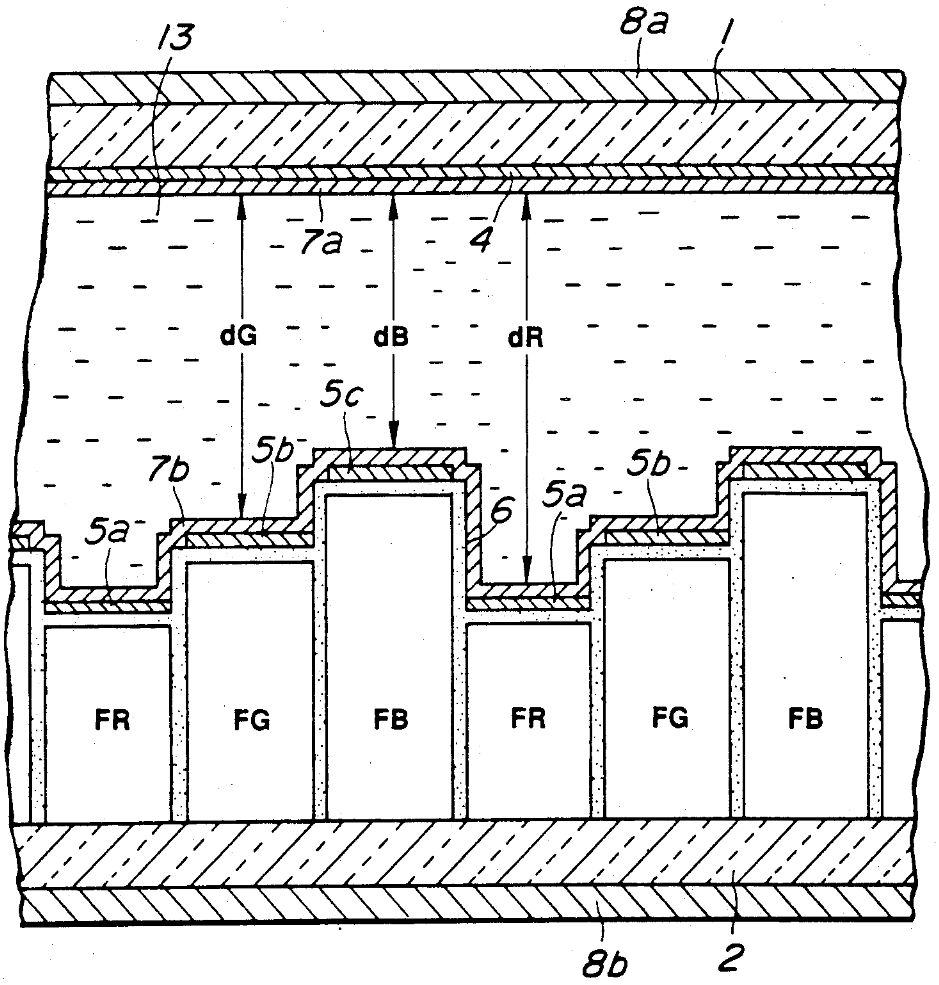
FIG. 2 is a cross-sectional view illustrating the configuration of a conventional liquid crystal display element.
Figure 3:
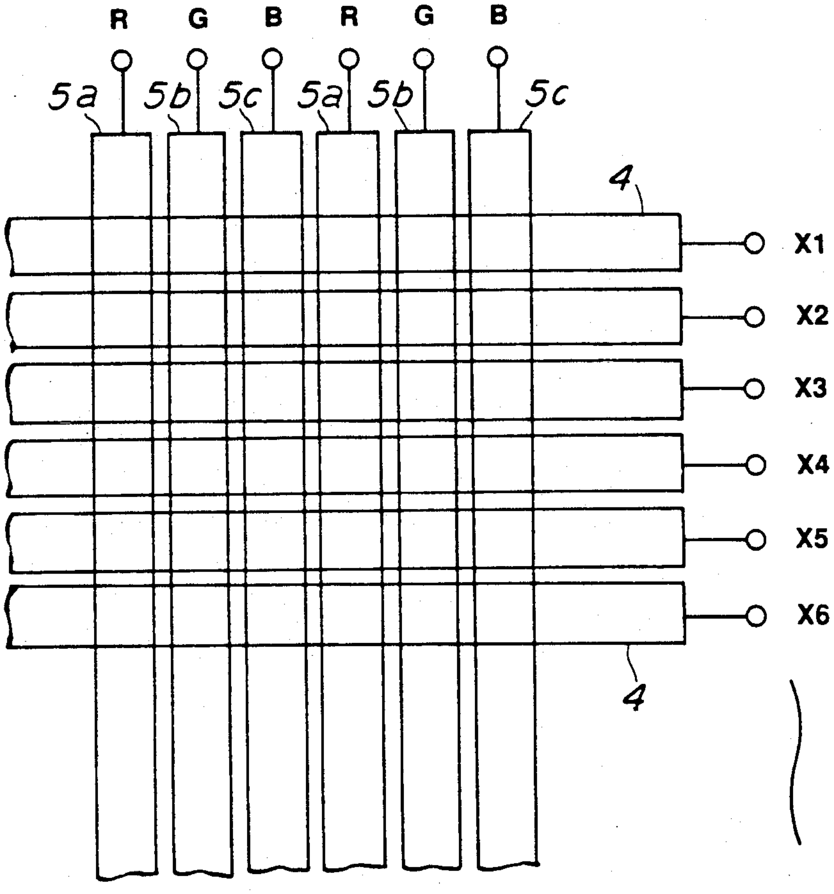
FIG. 3 is a diagram illustrating the arrangement of signal electrodes and scan electrodes of the liquid crystal display element.

Preferred embodiments of this invention will now be described referring to the accompanying drawings. In FIG. 2, the thicknesses of the color filters FR, FG and FB are adjusted to set the maximum height difference within 1 μm, for example. For instance, with the thickness of the red filter FR being kept held at the optimum value, the height difference between the red filter FR and green filter FG is set to 0.5 μm and the height difference between the green filter FG and blue filter FB is also set to 0.5 μm, thus setting the maximum height difference between the filters within 1 μm. And the liquid crystal display panel having the individual filters set to have the above thicknesses is driven by the driver as shown in FIG. 4.

Figure 4:
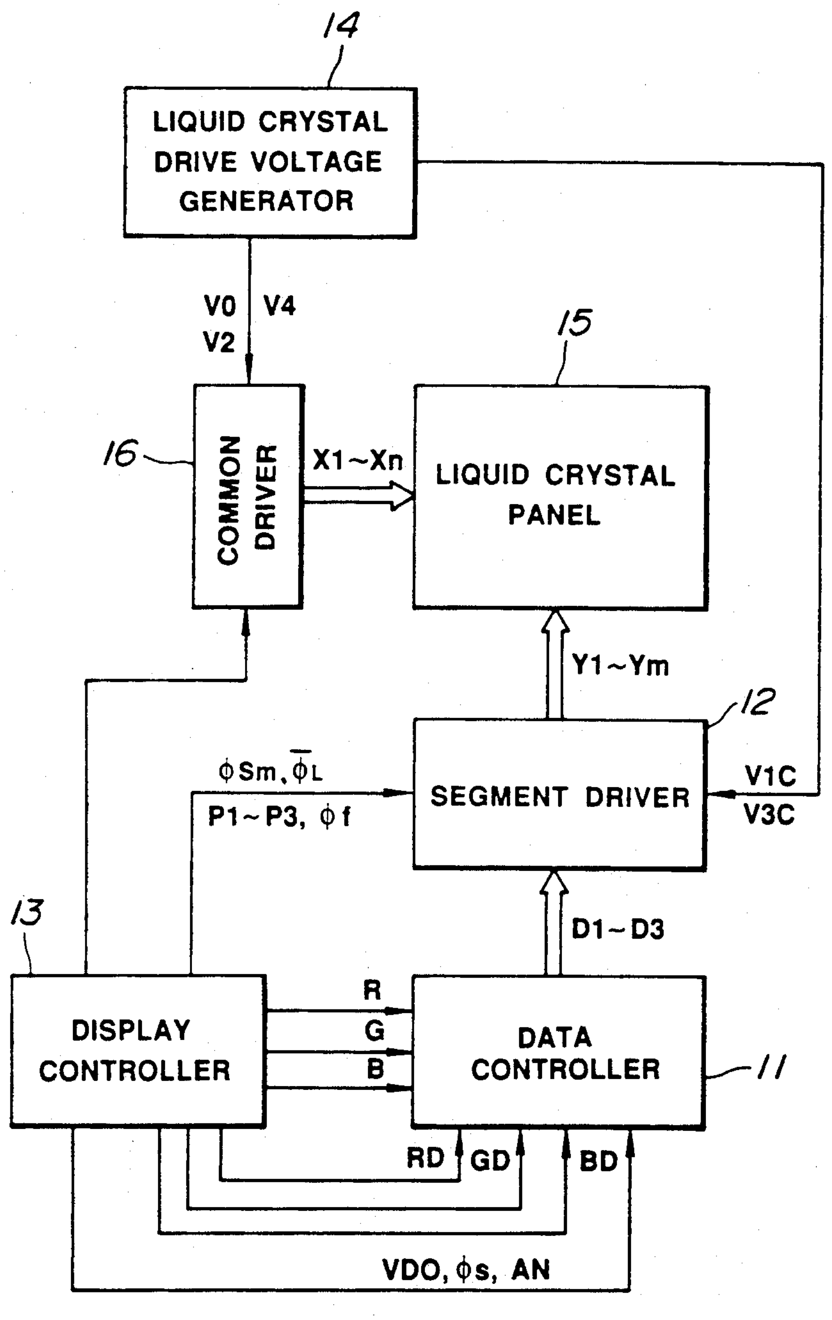

FIG. 4 schematically illustrates the general configuration of a liquid crystal panel driver. Referring to the diagram, reference numeral 11 is a data controller which is supplied with R, G and B color signals as well as no-bias (zero-bias) control data RD, GD and BD from a display controller 13. The data controller 11 also receives a data output control signal VDO, sampling signal φs, gate control signals AN (AN1, AN2, . . . ), etc. As will be described in a later section, the data controller 11 selectively outputs the input signals in accordance with the data output control signal VDO. More specifically, the data controller 11 selects the color signals R, G and B during an image display period and selects the no-bias control data RD, GD and BD during a non-display period, and it outputs the selected signals as 3-bit data D1 to D3. In this case, the no-bias control data RD, GD and BD specify effective voltage values in the no-bias interval for each of the R, G and B signals, by the amount of the height difference reduced between the color filters FR, FG and FB. Specifying the effective voltage values provide the optimum value for Δn·d. The data D1 to D3 are 8-gradation specifying data, with D1 on the LSB side and D3 on the MSB side, for example.

The data D1-D3 from the data controller 11 are sent to a segment driver 12 which is supplied with a sampling pulse φsm, latch pulse φL, intensity (luminance) modulation pulses P1-P3 and a frame signal φf from the controller 13 as well as liquid crystal drive voltages V1c and V3c from a liquid crystal drive voltage generator 14.

The segment driver 12 (which will be described in detail in a later section) operates in accordance with various timing signals from the display controller 13, and receives the video data D1-D3 from the data controller 11 to prepare, for example, 8-gradation segment drive signals Y1 to Ym for driving segment electrodes (signal electrodes) of a liquid crystal panel 15. This liquid crystal display panel 15 is designed in the manner described earlier so that the thicknesses of the color filters FR, FG and FB are adjusted to provide the maximum height difference within 1 μm.

As will be described in detail later, in accordance with the no-bias timing signal EC and frame signal φf as shown in the timing chart of FIG. 5, the liquid crystal drive voltage generator 14 prepares the drive voltage V1c from the liquid crystal drive voltages V1 and V2 and prepares the drive voltage V3c from the liquid crystal drive voltages V2 and V3, and outputs these voltages to the segment driver 12. The voltage generator 14 sends the liquid crystal drive voltages V0, V2 and V4 to a common driver 16. This driver 16, which operates in accordance with the timing signal from the display controller 13, selects the liquid crystal drive voltages V0, V2 and V4 from the voltage generator 14 to prepare common drive signals X1-Xn and sequentially drive the common electrodes of the liquid crystal panel 15.

A detailed description will be given below of the data controller 11, segment driver 12 and liquid crystal voltage generator 14.

Figure 5:
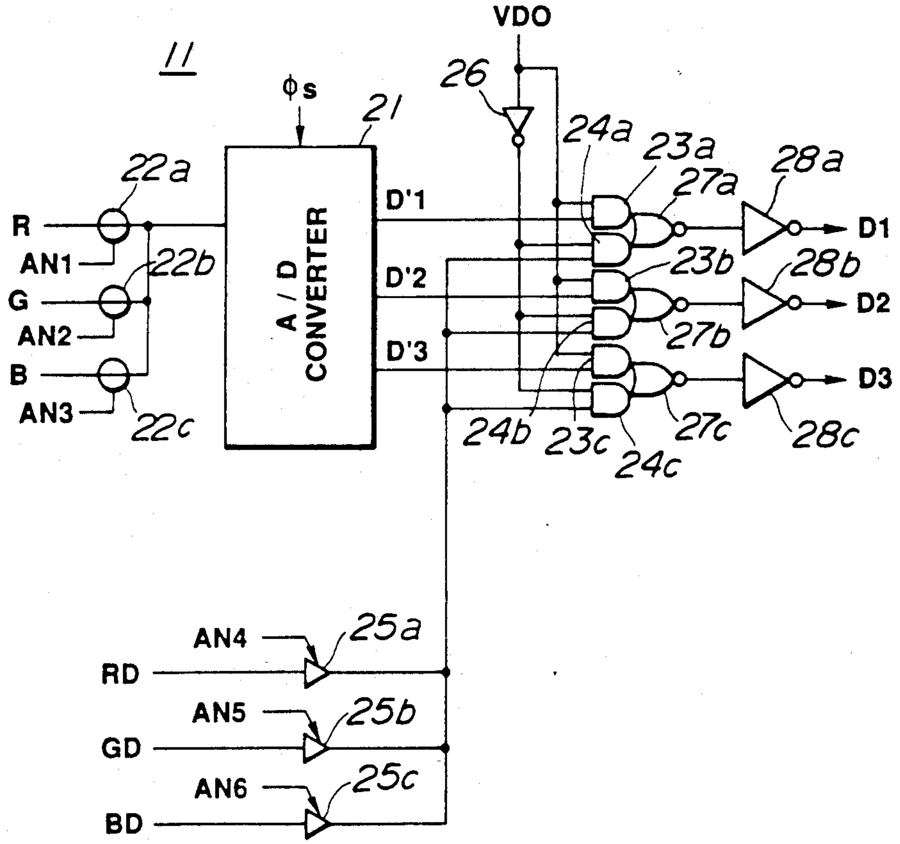

FIG. 5 gives a detailed illustration of the data controller 11. Referring to this diagram, reference numeral 21 is an A/D converter which receives the color signals R, G and B from the display controller 13 through gate circuits *22a* to *22c*. The ON/OFF operation of the gate circuits *22a-22c* is controlled by the gate control signals AN1-AN3 from the display controller 13. The A/D converter 21 performs sequential sampling of an input signal in accordance with the sampling signal $\phi s$ and converts it into 3-bit data D1', D2' and D3', which are output to the AND circuits *23a-23c*. The AND circuits *23a-23c* are supplied with the data output control signal VDO from the display controller 13. The no-bias control data RD, GD and BD from the display controller 13 are input to AND circuits *24a* to *24c* through 3-state buffers *25a* to *25c*. The ON/OFF operation of the 3-state buffers *25a-25c* is controlled by gate control signals AN4-AN6 from the display controller 13. The AND circuits *24a-24c* are supplied with the data output control signal VDO through an inverter 26. The output signals of the AND circuits *23a-23c* and *24a-24c* are output as the data D1-D3 respectively through NOR circuits *27a-27c* and inverters *28a-28c*, and are sent to the segment driver 12.

Figure 6:
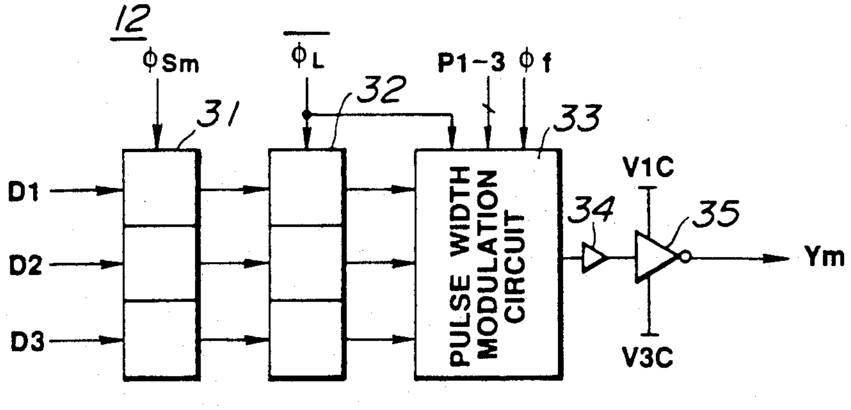

FIG. 6 illustrates the structure of one stage of the segment driver 12, in which the data D1-D3 from the data controller 11 are input in a 3-bit register 31. The register 31 latches the input data D1-D3 in synchronization with the sampling pulse $\phi sm$ and outputs it to a latch circuit 32. The latch circuit 32 latches the data held in the register 31 in accordance with the latch pulse $\phi L$ outputs it to a pulse width modulation circuit 33. The circuit 33 latches the latched data by means of the latch pulse $\phi L$ prepares an 8-gradation signal from the intensity modulation pulses P1-P3. The pulse width modulation circuit 33 also inverts and outputs the gradation signal, prepared according to the data D1-D3, in accordance with the frame signal $\phi f$. The output signal of the circuit 33 has its level shifted by a level shifter 34 and is output as the segment drive signal Ym through an inverter 35. The inverter 35 is supplied with the liquid crystal drive voltages V1c and V3c from the liquid crystal drive voltage generator 14.

Figure 7:
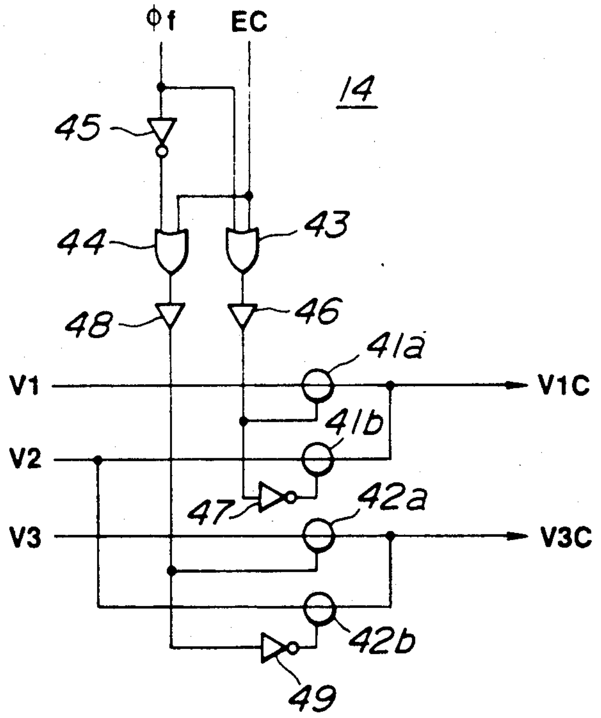

FIG. 7 illustrates in detail the segment drive voltage generating section in the liquid crystal drive voltage generator 14. In the diagram, reference numerals 41*a*, 41*b*, 42*a* and 42*b* are gate circuits, the first two gate circuits 41*a* and 41*b* being supplied with the liquid crystal drive voltages V1 and V2 and the latter two gate circuits 42*a* and 42*b* being supplied with the liquid crystal drive voltages V3 and V2. The no-bias timing signal EC from the display controller 13 is input to OR circuits 43 and 44, and the frame signal $\phi f$ is input directly to the OR circuit 43 and to the OR circuit 44 through an inverter 45. The output signal of the OR circuit 43 is supplied to the gate terminal of the gate circuit 41*a* through a level shifter 46 and is further supplied therefrom to the gate terminal of the gate circuit 41*b* through an inverter 47. The output signal of the OR circuit 44 is supplied to the gate terminal of the gate circuit 42*a* through a level shifter 48 and is further supplied therefrom to the gate terminal of the gate circuit 42*b* through an inverter 49. The output signals of the gate circuits 41*a* and 41*b* serve as the liquid crystal drive voltage V1c, while the output signals of the gate circuits 42*a* and 42*b* serve as the liquid crystal drive voltage V3c.

Figures 8A, 8B, 8C, 8D, 8E, 8F, 8G, 8H:
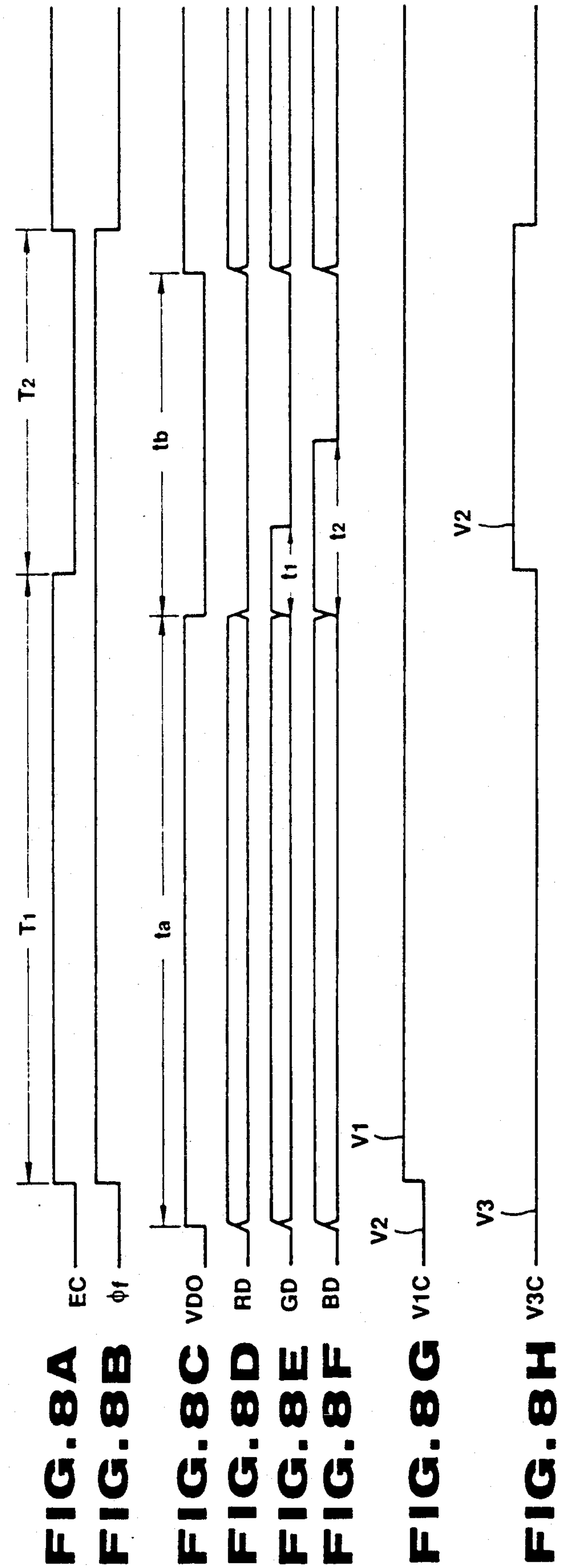
FIGS. 8A to 8H and 9A to 9G are timing charts for explaining the operation of the first embodiment.

The operation of the above embodiment will now be described. The segment drive voltage generating section in the drive voltage generator 14 shown in FIG. 7 is controlled by the no-bias timing signal EC and frame signal $\phi f$ shown in the timing charts of FIGS. 8B and 9B. The signal EC (FIGS. 8A and 9A) is kept at a high level during a video signal display period T1 and at a low level during a non-display period T2, such as a vertical blanking period, in each field in which the frame signal $\phi f$ is at a high level or low level. When both of the timing signal EC and frame signal $\phi f$ are at a low level, the gate circuit 41*b* is turned ON and the voltage V2 is taken as the segment drive voltage V1c (FIG. 8H), and when either signal EC or $\phi f$ becomes a high level, the gate circuit 41*a* is turned ON and the voltage V1 is taken as V1c (FIG. 8G). With regard to the segment drive voltage V3c output through the gate circuits 42*a* and 42*b*, the gate circuit 42*b* is turned on and the voltage V2 is taken as V3c only when the timing signal EC is at a low level and the frame signal $\phi f$ is at a high level, and the gate circuit 42*a* is turned on otherwise and the voltage V3 is taken as V3c.

Accordingly, the data controller 11 (see FIG. 5 for its detailed illustration) selectively outputs the color signals R, G and B or the no-bias control data RD, GD and BD (FIGS. 8D to 8F), by means of the data output control signal VDO (FIG. 8C). This control signal VDO has the same signal waveform as the no-bias timing signal EC and has a high-level duration ta and a low-level duration tb. In consideration of the delay time in the segment driver 12, however, the signal VDO is given at a timing slightly earlier than the signal EC. During the high-level duration ta of the control signal VDO, the gate control signals AN1-AN3 from the display controller 13 are supplied to the gate circuits *22a-22c* to open them, and the color signals R, G and B are input to the A/D converter 21. The A/D converter 21 converts the received signals R, G and B into 3-bit video data D1'-D3' in synchronization with the sampling signal $\phi sm$ and sends the data to the AND circuits *23a-23c*. Since the gates of the AND circuits *23a-23c* are opened during the high-level duration ta of the control signal VDO, the video data D1'-D3' from the A/D converter 21 are taken as data D1-D3 and sent to the segment driver 12 through the AND circuits *23a-23c*, NOR circuits *27a-27c* and inverters *28a-28c*.

Thereafter, when the control signal VDO becomes a low level, the gates of the AND circuits *23a-23c* are closed and the gates of the AND circuits *24a-24c* are opened during the low-level duration tb. During the low-level duration tb of the control signal VDO, the gate control signals AN4-AN6 as well as the no-bias control data RD, GD and BD, set to specific values, are supplied to the 3-state buffers *25a-25c* from the display controller 13. In accordance with the control data RD, GD and BD, a signal with all "1" (high level) or all "0" (low level) is output as the data D1-D3. In this case, the control data RD, GD and BD may be set as shown in FIGS. 8D to 8F. More specifically, the data RD is preset so that D1-D3 are all "0" over the entire low-level duration tb of the control signal VDO, the data GD is pre-set so that D1-D3 are all "1" for a given period t1 and are all "0" for the remaining period, and the data BD is pre-set so that D1-D3 are all "1" for a period t2 longer than t1 and are all "0" for the remaining period. The no-bias interval of the liquid crystal display panel 15 is determined by the data D1-D3 in the non-bias period.

Consequently, the data D1-D3 from the data controller 11 are read by the segment driver 12 which in turn prepares the segment drive signals Y1-Ym. That is, the segment driver 12 (see FIG. 6 for its detailed illustration) reads the data D1-D3 from the data controller 11 into the register 31 in synchronization with the sampling pulse $\phi$sm. The sampling pulse $\phi$sm ($\phi$s1, $\phi$s2, . . . , $\phi$sm), which is prepared by the sampling start signal $\phi$ST (see FIG. 9D) in association with the individual segment terminals, is output one pulse between the generation of the latch pulses $\overline{\phi L}$ (FIG. 9C) after the data D1-D3 are supplied. This sampling pulse $\phi$sm permits the data D1-D3 to be sequentially transferred to those regions of the register 31 which are associated with the individual segment terminals. When the data D1-D3 are read into the register 31 at the all stages, the latch pulse $\overline{\phi L}$ is supplied to the latch circuit 32 so that the data held in the register 31 is latched in the circuit 32 and is then transferred to the pulse width modulation circuit 33.

Figures 9A, 9B, 9C, 9D, 9E, 9F, 9G:
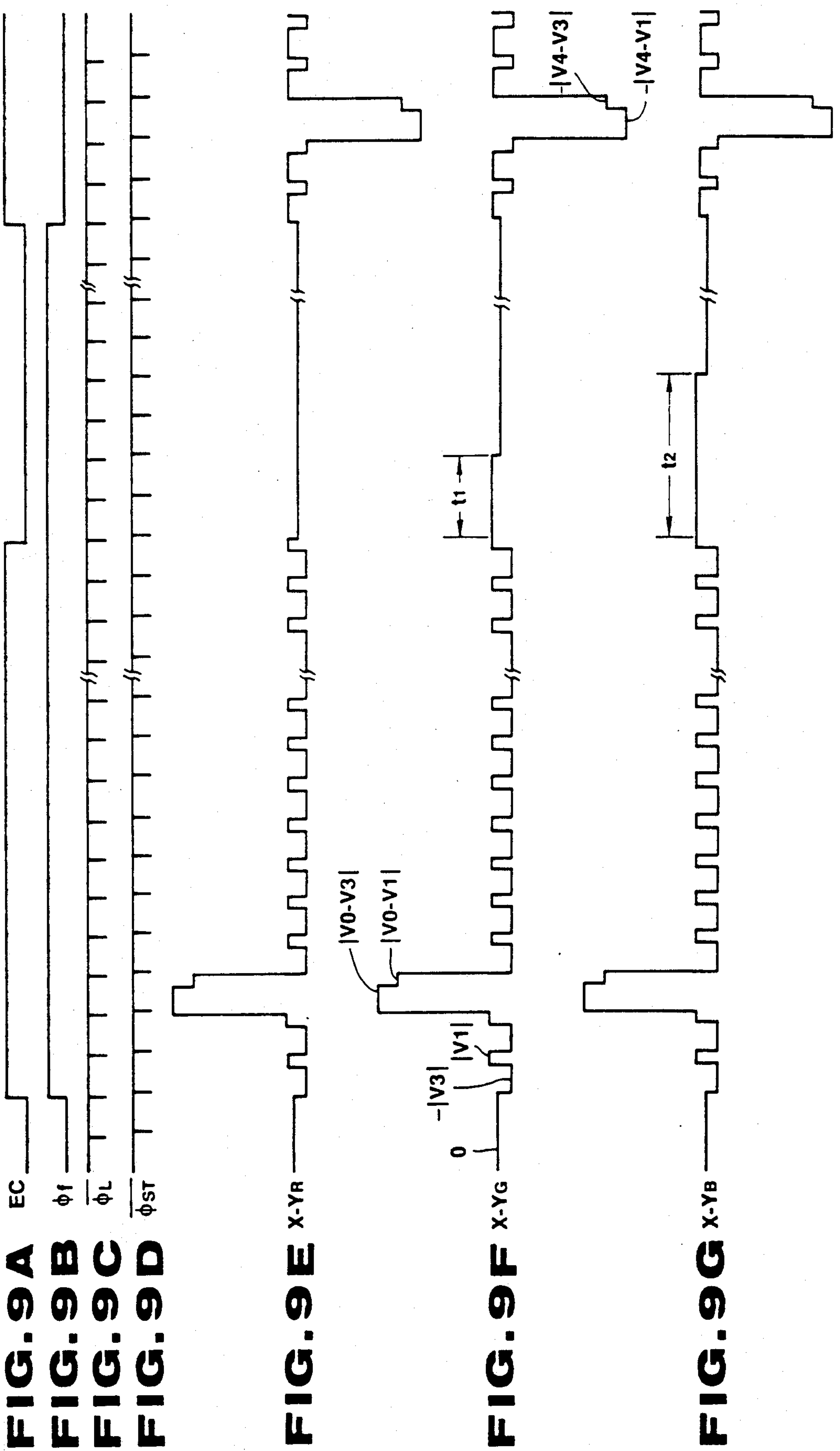

This pulse width modulation circuit 33 performs intensity modulation using the intensity modulation pulses P1-P3 in accordance with the latched data and prepares an 8-gradation signal. This gradation signal is inverted in synchronization with the frame signal $\phi$f and is output as the segment drive signal Ym through the level shifter 34 and inverter 35. In this case, the segment drive signals $Y_R$, $Y_G$ and $Y_B$ are prepared for the respective color signals R, G and B and drive the associated segment electrodes of the liquid crystal panel 15. The common electrodes of the liquid crystal panel 15 are driven by the common driver 16. X-$Y_R$, X-$Y_G$ and X-$Y_B$ in FIGS. 9E to 9G are the waveforms of the synthesized drive voltages between the common electrodes and segment electrodes (R, G and B) of the liquid crystal panel 15 in a case where reference voltage $V_2$ is set at O V. The no-bias timing signal EC is set at a high level, that is, the segment drive signal based on the video data D1'-D3' is given during the video signal display period and the voltage level is |V1| and −|V3|. With the common electrodes being selected, therefore, the synthesized drive voltages X-$Y_R$, X-$Y_G$ and X-$Y_B$ between the common and segment electrodes become |V0-V3| and |V0-V1| when the frame signal $\phi$f is at a high level and become −|V4-V1| and −|V4-V3| when the frame signal $\phi$f is at a low level. These synthesized drive voltages X-$Y_R$, X-$Y_G$ and X-$Y_B$ drive the liquid crystal panel 15.

During the no-bias period T2 in which the no-bias timing signal EC is at a low level, the segment signal Ym based on the no-bias control data RD, GD and BD is output from the segment driver 12. When the frame signal $\phi$f is at a high level, therefore, the synthesized drive voltage X-$Y_R$ between the common and segment electrodes is kept at the |V1| (|V1-V2|) level over the period T2. The synthesized drive voltage X-$Y_G$ is kept at the |V1| (|V1−V2|) level for time t1 in the period T2 and is kept at the |V2−V2|, i.e., O V level for the remaining period. The synthesized drive voltage X-$Y_B$ is kept at the |V1| (|V1−V2|); level for time t2 in the period T2 and is kept at the |V2−V2| level for the remaining period. When the frame signal $\phi$f is at a low level, the drive voltages with their levels being inverted from those in the above case are applied between the common and segment electrodes.

In the manner described above, the drive voltages for the R, G and B segment electrodes can be independently set and the birefringence Δn of the liquid crystal element can be set at the optimum to provide the optimum value for Δn·d even if the thicknesses of the color filters differ from the optimum values.

Although a DC voltage is applied during periods t1 and t2 in FIGS. 9F and 9G, an AC voltage may be applied instead.

Second Embodiment

Figure 10:
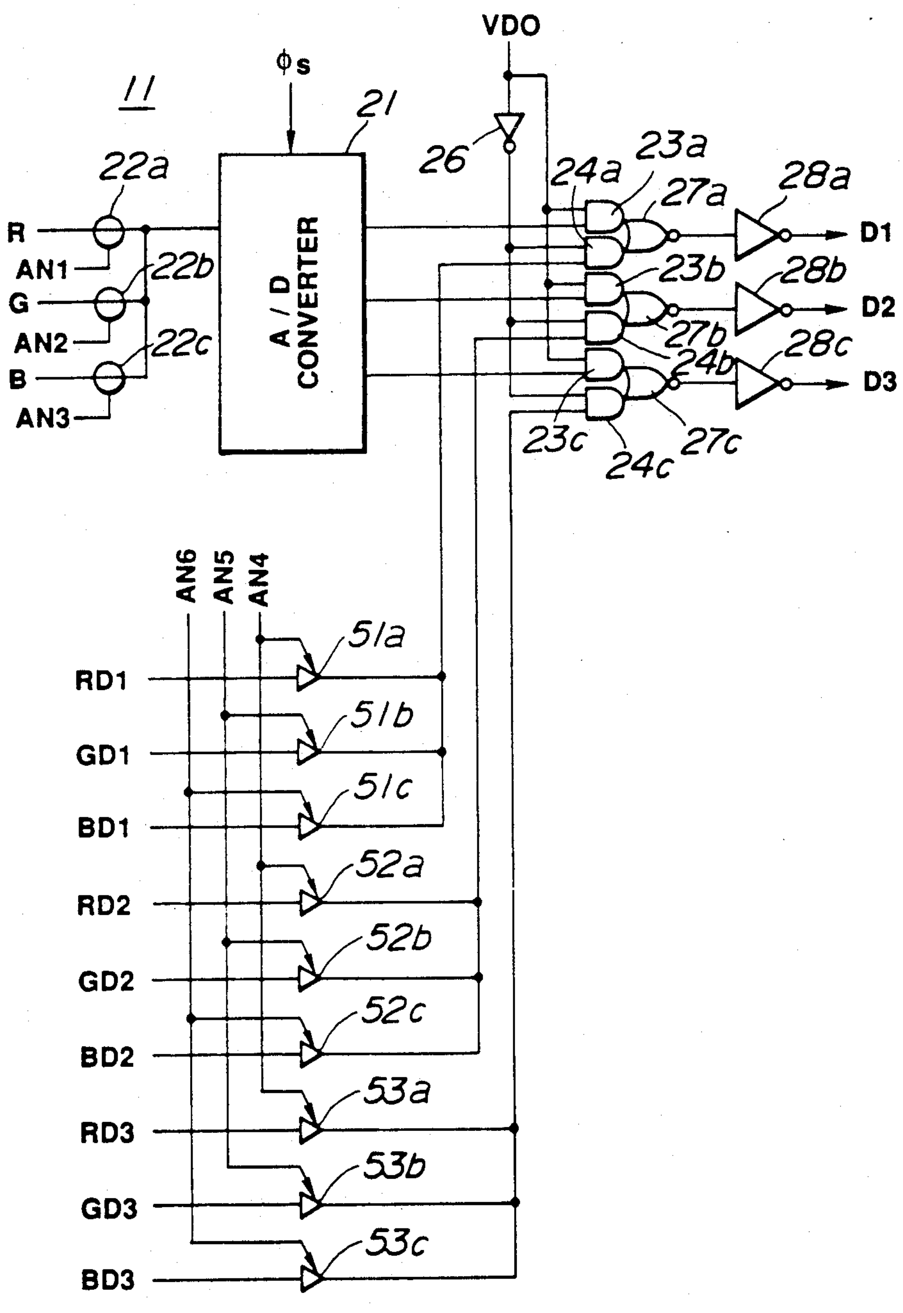
FIG. 10 is a diagram illustrating the structure of a data controller according to the second embodiment.
Figures 11A, 11B, 11C, 11D, 11E:
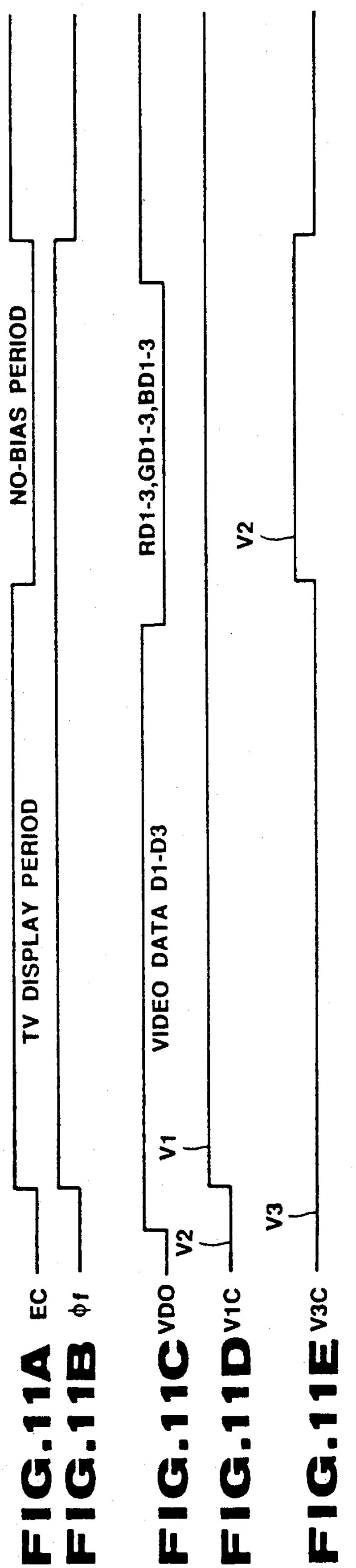
FIGS. 11A to 11E and 12A to 12G are timing charts for explaining the operation of the second embodiment.

The second embodiment of this invention will now be described referring to FIGS. 10 to 12G. According to this embodiment, the data controller 11 shown in FIGS. 4 and 5 is constituted as shown in FIG. 10. More specifically, the data controller according to the embodiment shown in FIG. 10 employs three sets of 3-state buffers 51a-51c, 52a-52c and 53a-53c in place of the 3-state buffers 25a-25c of the data controller 11 shown in FIG. 5. The first set of buffers 51a-51c are supplied with no-bias control data RD1, GD1 and BD1 from the display controller 13 shown in FIG. 4. The second set of buffers 52a-52c are supplied with no-bias control data RD2, GD2 and BD2 from the controller 13, and the third et of buffers 53a-53c are supplied with no-bias control data RD3, GD3 and BD3 from the controller 13. The buffers 51a, 52a and 53a are supplied with the gate control signal AN4, the buffers 51b, 52b and 53b with the gate control signal AN5, and the buffers 51c, 52c and 53c with the gate control signal AN6. The output signals of the buffers 51a-51c are supplied to the AND circuit 24a, the output signals of the buffers 52a-52c to the AND circuit 24c, and the output signals of the buffers 53a-53c to the AND circuit 24c. The other section of the data controller of the second embodiment has the same structure as that of the data controller 11 shown in FIG. 5.

Figures 12A, 12B, 12C, 12D, 12E, 12F, 12G:
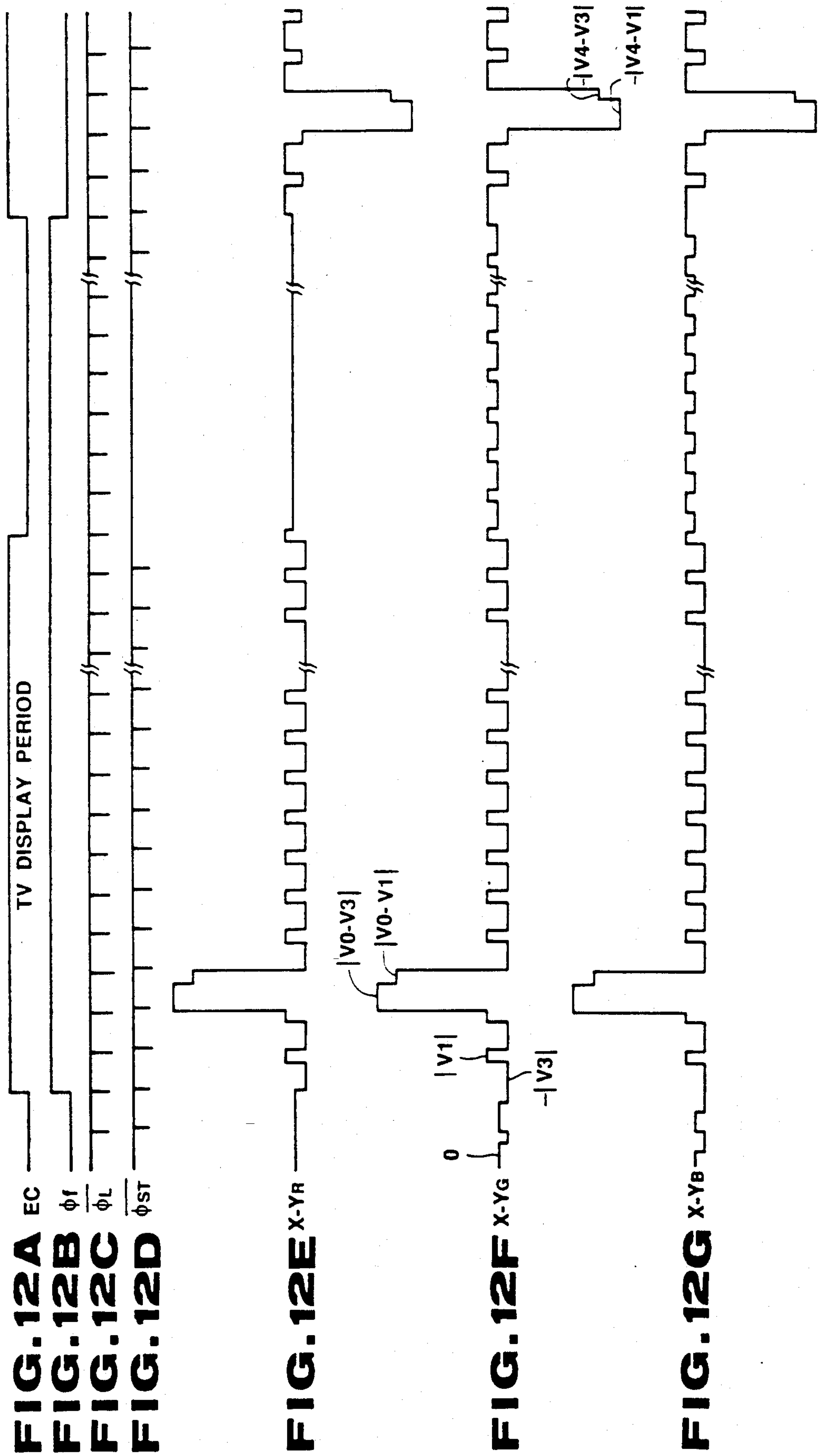

The display controller 13 stops the generation of the sampling start signal $\phi$ST inhibit the supply of the sampling pulse $\phi$sm to the register 31 of the segment driver 12, during the non-display period T2 in which the no-bias timing signal EC is at a low level (see the timing chart shown in FIG. 12A). In other words, during the no-bias period T2, the no-bias control data RD1-RD3, RG1-RG3 and RB1-RB3 given as the data D1-D3 from the data controller 11 are held intact in the register 31.

With the above arrangement, the no-bias control data RD1-RD3, GD1-GD3 and BD1-BD3, which serve to set the gradation levels in no-bias period, are set as follows:

RD1 to RD3: "0 0 0" (gradation 0),
GD1 to GD3: "0 1 0" (gradation 2), and
BD1 to BD3: "0 0 1" (gradation 4).

During the period in which the data output control signal VDO is at a low level (see the timing chart shown in FIG. 11C), thus set control data RD1-RD3, GD1-GD3 and BD1-BD3 are taken out through the AND circuits 24a-24c and are further sent as the data D1-D3 to the segment driver 12 through the NOR circuits 27a-27c and inverters 28a-28c. The segment driver 12 transfers the control data RD1-RD3, GD1-GD3 and BD1-BD3 (given as D1-D3) into the register 31 in synchronization with the sampling pulse $\phi$sm. Then, the input of the sampling pulse $\phi$sm to the register 31 is inhibited, so that the data transferred to this register is held as it is during the no-bias period T2. The segment driver 12 reads out the data held in the register 31 in synchronization with the latch pulse $\overline{\phi L}$ (FIG. 12C), repeatedly prepares a gradation signal according to the data and outputs the segment drive signal Ym.

The liquid crystal panel 15 is driven by the segment drive signal Ym from the segment driver 12 and the common drive signal Xn from the common driver 16. $X\text{-}Y_R$, $X\text{-}Y_G$ and $X\text{-}Y_B$ shown in FIGS. 12E to 12G are the waveforms of the synthesized drive voltages between the common and segment electrodes of the liquid crystal panel 15 at that time in a case where reference voltage V2 is set at O V. The synthesized drive voltages will have the gradation waveforms set by the aforementioned no-bias control data RD1-RD3, GD1-GD3 and BD1-BD3 during the no-bias period T2 in which the no-bias timing signal EC is at a low level. In other words, since "0 0 0" is specified by the control data RD1-RD3 in the no-bias period T2, the drive voltages $X\text{-}Y_R$ is selected to be the no-bias voltage $|V2|$, i.e., 0 V over the entire period T2. Since "0 1 0" is specified by the control data GD1-GD3 in the no-bias period T2, the drive voltages $X\text{-}Y_G$ is selected to be $|V1|$ or $|V3|$ corresponding to the gradation 2 every time the latch pulse $\overline{\phi L}$ is applied, and is selected to be no-bias voltage $|V2|$ otherwise. Since "0 0 1" is specified by the control data BD1-BD3 in the no-bias period T2, the drive voltages $X\text{-}Y_B$ is selected to be $|V1|$ or $|V3|$ corresponding to the gradation 4 every time the latch pulse $\overline{\phi L}$ is applied, and is selected to be no-bias voltage $|V2|$ otherwise. Although a DC voltage is applied as a waveform corresponding to the gradation 2 or 4, an AC voltage may be applied instead.

In the above manner, with regard to the individual drive voltages $X\text{-}Y_R$, $X\text{-}Y_G$ and $X\text{-}Y_B$, the time durations of the selected voltages are set different from one another during the no-bias period T2, thereby providing different effective voltage values. The effective voltage values can be arbitrarily set by the control data RD1-RD3, GD1-GD3 and BD1-BD3, and the double refraction factor $\Delta n$ can be set to such a value as to provide the optimum value for $\Delta n \cdot d$ even if the thicknesses of the individual color filters differ from the optimum values.

Although the effective voltage value of an image signal is changed for each color by varying the voltage-applying time during the non-display period according to the first and second embodiments, the effective voltage value may be changed by varying the value of the voltage applied.

Although, according to these embodiments, the no-bias driving is executed with effective voltage values that are mutually different for the individual colors, red, green and blue, the no-bias driving needs only to be effected with the effective voltage values at least two of which differ from each other.

Third Embodiment

Figure 13:
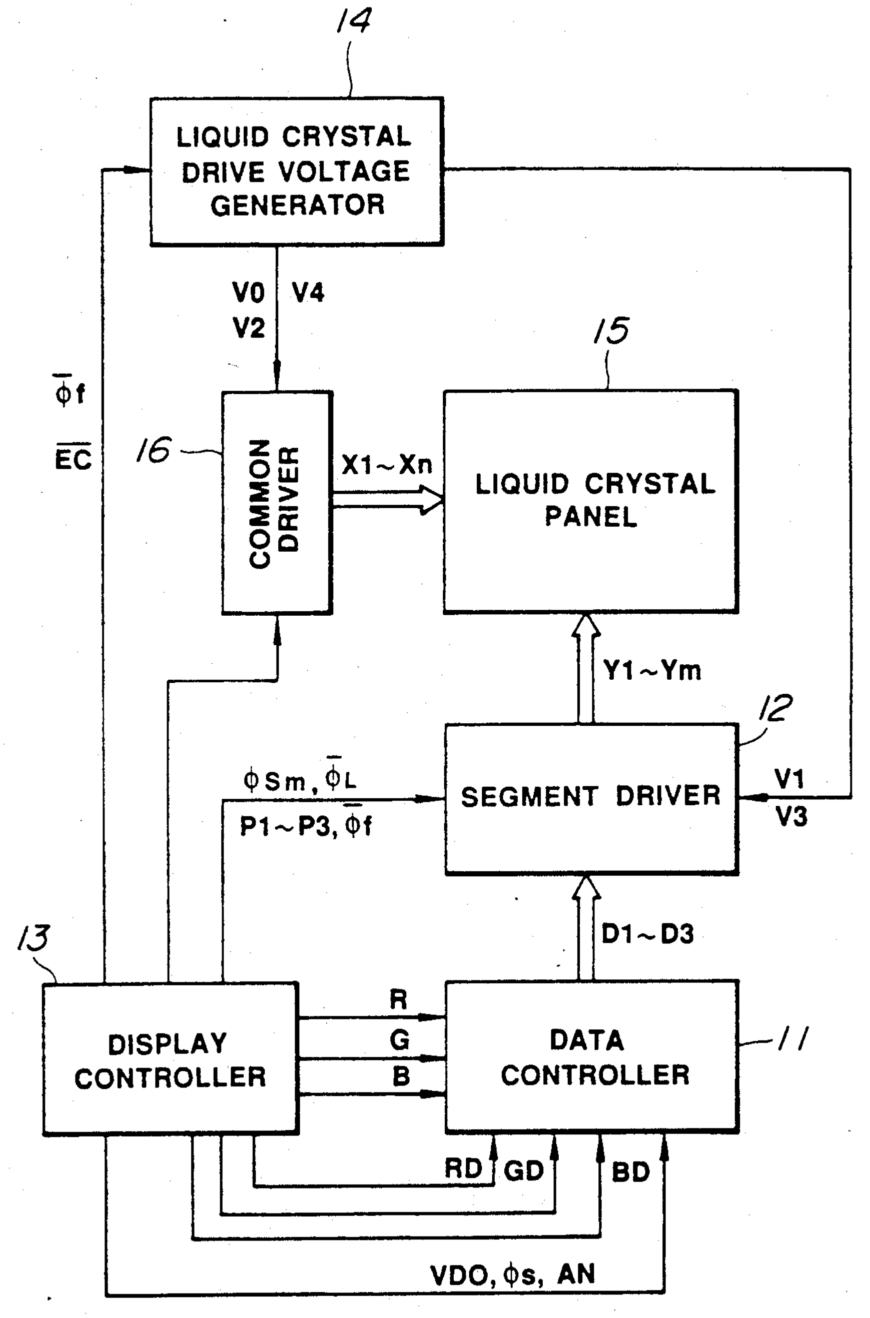

FIG. 13 schematically illustrates the general configuration of a liquid crystal panel driver. Referring to the diagram, reference numeral 111 is a data controller which is supplied with R, G and B color signals as well as bias control data RD, GD and BD from a display controller 113. The data controller 111 also receives a data output control signal VDO, sampling signal $\phi s$, gate control signals AN (AN1, AN2, . . . ), clock pulse $\phi ck$, etc. As will be described in a later section, the data controller 111 selectively outputs the input signals in accordance with the data output control signal VDO. More specifically, the data controller 111 selects the color signals R, G and B during an image display period and selects the bias control data RD, GD and BD during a non-display period, and it outputs the selected signals as 3-bit data D1 to D3. In this case, the bias control data RD, GD and BD specify effective voltage values in the non-display interval for each of the R, G and B signals, by the amount of the height difference reduced between the color filters FR, FG and FB. Specifying the effective voltage values provide the optimum value for $\Delta n \cdot d$. The data D1 to D3 are 8-gradation specifying data, with D1 on the LSB side and D3 on the MSB side, for example.

The data D1-D3 from the data controller 111 are sent to a segment driver 112 which is supplied with a sampling pulse $\phi sm$, latch pulse $\overline{\phi L}$, intensity modulation pulses P1-P3 and a frame signal $\overline{\phi f}$ from the controller 113 as well as liquid crystal drive voltages V1 and V3 from a liquid crystal drive voltage generator 114.

The segment driver 112 operates in accordance with various timing signals from the display controller 113, and receives the video data D1-D3 from the data controller 111 to prepare, for example, 8-gradation segment drive signals Y1 to Ym for driving segment electrodes (signal electrodes) of a liquid crystal panel 115. This liquid crystal display panel 115 is designed in the manner described earlier so that the thicknesses of the color filters FR, FG and FB are adjusted to provide the maximum height difference within 1 $\mu$m.

The liquid crystal drive voltage generator 114 generates crystal drive voltages V1 and V3 and supplies them to the segment driver 112. The voltages V1 and V3 are held at constant bias voltages vb and $-$vb, respectively. As will be describe in a later section, the liquid crystal drive voltage generator 114 prepares the bias voltages vb and $-$vb in accordance with the non-display period signal $\overline{EC}$ and frame signal $\overline{\phi f}$ (see the timing chart of FIGS. 17A and 17B) and prepares the liquid crystal drive voltage V2 from the ground potential GND. The voltage generator 114 further sends liquid crystal drive voltages V0 and V4 of a constant level to a common driver 116. This driver 116, which operates in accordance with the timing signal from the display controller 113, selects the liquid crystal drive voltages V0, V2 and V4 from the voltage generator 114 to prepare common drive signals X1-Xn and sequentially drive the common electrodes of the liquid crystal panel 115.

A detailed description will be given below of the data controller 111, segment driver 112 and liquid crystal voltage generator 114.

Figure 14:
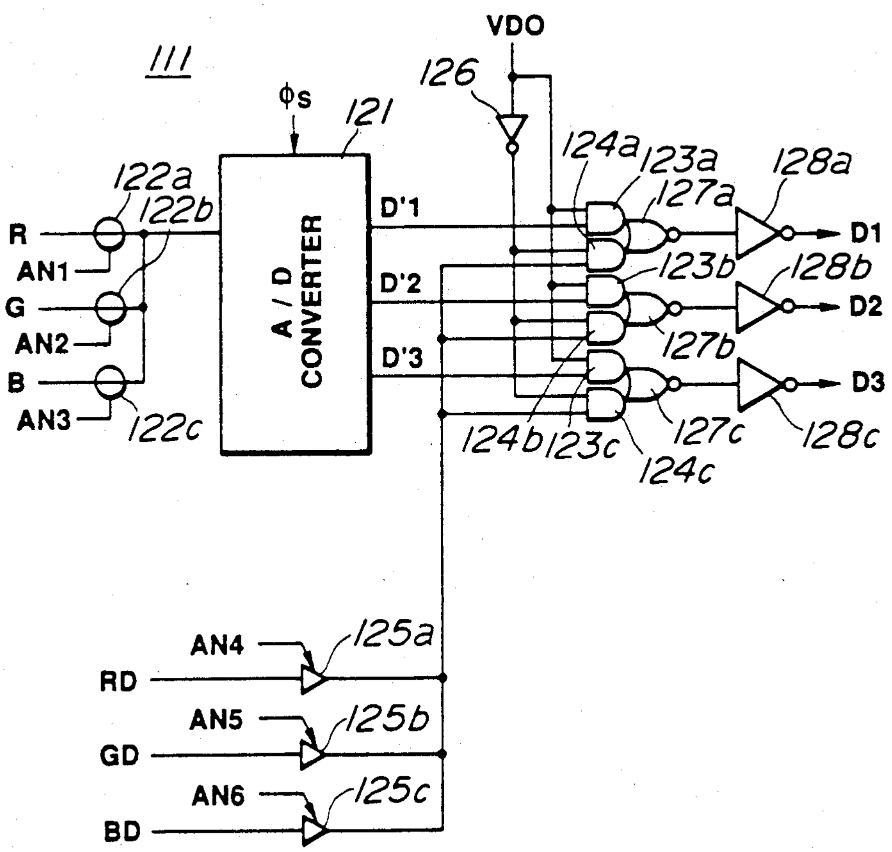

FIG. 14 gives a detailed illustration of the data controller 111. Referring to this diagram, reference numeral 121 is an A/D converter which receives the color signals R, G and B from the display controller 113 through gate circuits 122a to 122c. The ON/OFF operation of the AND circuits 122a-122c is controlled by the gate control signals AN1-AN3 from the display controller 113. The A/D converter 121 performs sequential sampling of an input signal in accordance with the sampling signal $\phi s$ and converts it into 3-bit data D1', D2' and D3', which are output to the AND circuits 123a-123c. The AND circuits 123a-123c are supplied with the data output control signal VDO from the display controller 113. The bias control data RD, GD and BD from the display controller 113 are input to AND circuits 124a to 124c through 3-state buffers 125a to 125c. The ON/OFF operation of the 3-state buffers 125a-125c is controlled by gate control signals AN- 4-AN6 from the display controller 113. The AND circuits 124$a$-124$c$ are supplied with the data output control signal VDO through an inverter 126. The output signals of the AND circuits 123$a$-123$c$ and 124$a$-124$c$ are output as the data D1-D3 respectively through NOR circuits 127$a$-127$c$ and inverters 128$a$-128$c$, and are sent to the segment driver 112.

Figure 15:
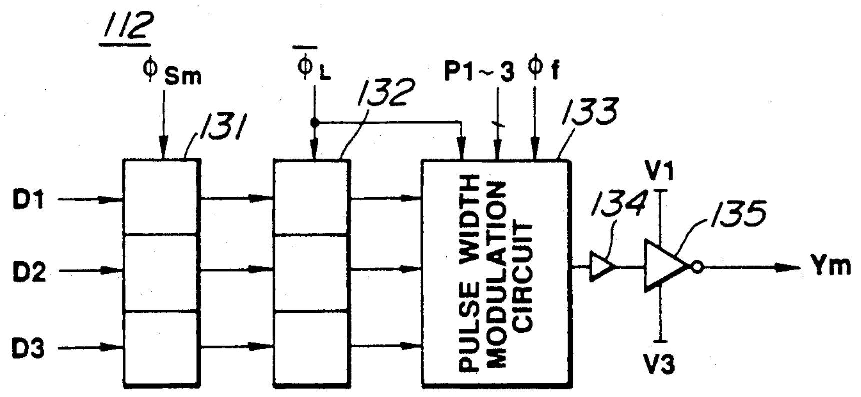

FIG. 15 illustrates the structure of one stage of the segment driver 112, in which the data D1-D3 from the data controller 111 are input in a 3-bit register 131. The register 131 latches the input data D1-D3 in synchronization with the sampling pulse $\phi sm$ and outputs it to a latch circuit 132. The latch circuit 132 latches the data held in the register 131 in accordance with the latch pulse $\overline{\phi L}$ and outputs it to a pulse width modulation circuit 133. The circuit 133 latches the latched data by means of the latch pulse $\phi L$ and prepares an 8-gradation signal from the intensity modulation pulses P1-P3. The pulse width modulation circuit 133 also inverts and outputs the gradation signal, prepared according to the data D1-D3, in accordance with the frame signal $\overline{\phi f}$. The output signal of the circuit 133 has its level shifted by a level shifter 134 and is output as the segment drive signal Ym through an inverter 135. The inverter 135 is supplied with the liquid crystal drive voltages V1 and V3 from the liquid crystal drive voltage generator 114.

Figure 16:
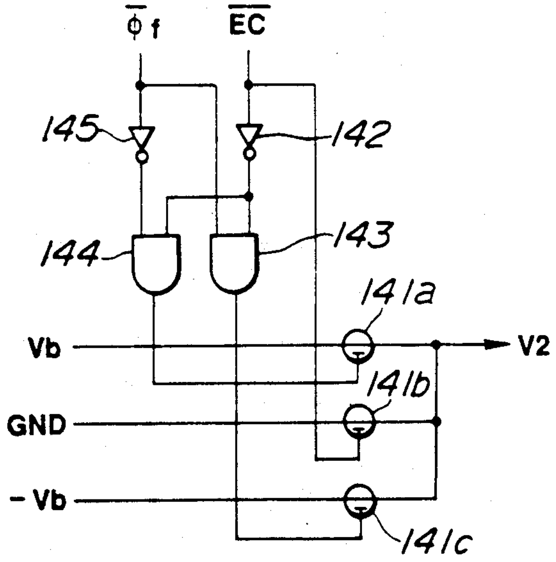

FIG. 16($a$) illustrates in detail the section in the liquid crystal drive voltage generator 114, which generates the common drive voltage V2. In FIG. 6($a$), reference numerals 141$a$, 141$b$, and 141$c$ are gate circuits, which are respectively supplied with the bias voltages vb, ground potential GND and bias voltage $-$vb. The non-display period signal $\overline{EC}$ from the display controller 113 is input to the gate terminal of the gate circuit 141$b$ and is input through an inverter 142 to AND circuits 143 and 144. The frame signal $\overline{\phi f}$ is input to the AND circuit 143 and is input through an inverter 145 to an AND circuit 144. The output signal of the AND circuit 143 is input to the gate terminal of the gate circuit 141$c$, and the output signal of the AND circuit 144 is input to the gate terminal of the gate circuit 141$a$. The output signals of the gate circuits 141$a$, 141$b$ and 141$c$ are extracted as the liquid crystal drive voltage V2.

The operation of the above embodiment will now be described. The common drive voltage generating section in the drive voltage generator 114 shown in FIG. 16($a$) is controlled by the non-display period signal $\overline{EC}$ and frame signal $\overline{\phi f}$ shown in the timing chart of FIGS. 17A and 17B, and the liquid crystal drive voltage V2 from the gate circuits 141$a$ to 141$c$ varies as shown in FIG. 16($b$). The former signal $\overline{EC}$ is kept at a high level during the video signal display period T1 and at a low level during the non-display period T2, such as a vertical blanking period, in the individual odd- and even-numbered fields in which the frame signal $\overline{\phi f}$ is at a high level or low level. When the signal $\overline{EC}$ is at an "L" (low) level, it is inverted to be an "H" (high) level before being input to the AND circuits 143 and 144, the one of the outputs of the AND circuits 143 and 144 becomes the "H" level in accordance with the level of the frame signal $\overline{\phi f}$. This controls the gate circuits 141$a$ and 141$c$ to determine the level of the liquid crystal drive voltage V2. In other words, if the frame signal $\overline{\phi f}$ is at the "L" level, the output of the AND circuit 144 has the "H" level and the gate of the gate circuit 141$a$ is opened. As a result, the bias voltage vb is output as the liquid crystal drive voltage V2. If the frame signal $\phi f$ is at the "H" level, however, the output of the AND circuit 143 will have the "H" level and the gate of the gate circuit 141$c$ is opened. As a result, the bias voltage $-$vb is output as the liquid crystal drive voltage V2. If the non-display period signal $\overline{EC}$ is at the "H" level, the gate of the gate circuit 141$b$ is opened and the ground potential GND is output as the liquid crystal drive voltage V2. Since the output of the inverter 142 becomes the "L" level at this time, the outputs of the AND circuits 143 and 144 are kept at the "L" level to close the gates of the gate circuits 141$a$ and 141$c$, thereby inhibiting the output of the bias voltages vb and $-$vb.

Figures 17A, 17B, 17C, 17D, 17E, 17F, 17G, 17H, 17I, 17J, 17K:
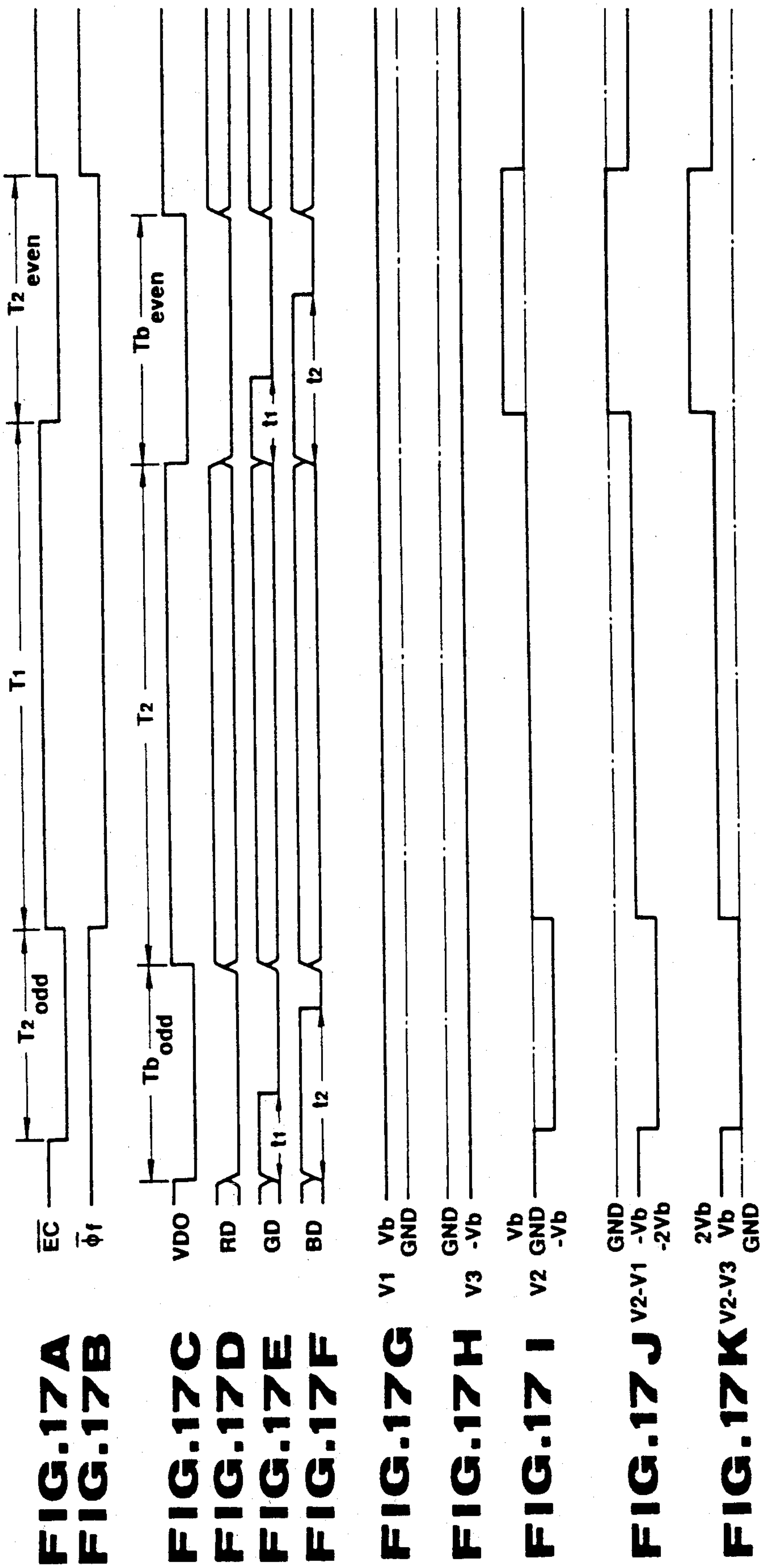

In other words, the liquid crystal drive voltage V2 is kept at the ground potential GND irrespective of the frame signal $\overline{\phi f}$ during the display period T1 in which the signal $\overline{EC}$ is at the high level as shown in FIG. 17A, but during the non-display period T2 during which the signal $\overline{EC}$ is at the low level, the voltage V2 is kept at "$-$vb" in the odd-numbered frames in which the frame signal $\overline{\phi f}$ is at the high level and is kept at "vb" in the even-numbered frames in which the frame signal $\phi f$ is at the low level.

The liquid crystal drive voltage V1 and V3 (FIGS. 17G and 17H) which is applied to the segment driver 112 are kept at constant potentials of "vb" and "$-$vb," respectively. Therefore, the relative voltages between the voltage V2 (FIG. 17I) applied to the common electrode driver 116 and the voltages V1 and V3 applied to the segment driver 112, "V2-V1" and "V2-V3," vary in the video signal display period T1 and non-display period T2, as shown in FIGS. 17J and 17K. More specifically, in the display period T1, "V2-V1" is "GND-vb$=-$vb" and "V2-V3" is "GND-($-$vb)$=$vb." In the odd-numbered frames wherein the frame signal $\overline{\phi f}$ is at the high level, however, "V2-V1" is "$-$vb-vb$=-2$vb" and "V2-V3" is "$-$vb-($-$vb)$=$GND." In the even-numbered frames where the frame signal $\overline{\phi f}$ is at the low level, "V2-V1" is "vb-vb$=$GND" and "V2-V3" is "vb-($-$vb)$=2$vb."

In the above manner, "V2-V1" changes around "$-$vb" between "GND" and "$-2$vb", while "V2-V3" changes around "vb" between "GND" and "2vb."

Accordingly, the data controller 111 (see FIG. 14 for its detailed illustration) selectively outputs the color signals R, G and B or the bias control data RD, GD and BD, by means of the data output control signal VDO. This control signal VDO has the same signal waveform as the non-display period signal $\overline{EC}$ and has a high-level duration ta and a low-level duration tb. In consideration of the delay time in the segment driver 112, however, the signal VDO is given at a timing slightly earlier than the signal $\overline{EC}$. During the high-level duration ta of the control signal VDO, the gate control signals AN1-AN3 from the display controller 113 are supplied to the gate circuits 122$a$-122$c$ to open them, and the color signals R, G and B are input to the A/D converter 121. The A/D converter 121 converts the received signals R, G and B into 3-bit video data D1'-D3' in synchronization with the sampling signal $\phi s$ and sends the data to the AND circuits 123$a$-123$c$. Since the gates of the AND circuits 123$a$-123$c$ are opened during the high-level duration ta of the control signal VDO, the video data D1'-D3' from the A/D converter 121 are taken as data D1-D3 and sent to the segment driver 112 through the AND circuits 123$a$-123$c$, NOR circuits 127$a$-127$c$ and inverters 128$a$-128$c$.

Thereafter, when the control signal VDO becomes the low level, the gates of the AND circuits 123$a$-123$c$ are closed and the gates of the AND circuits 124a-124c are opened during the low-level duration tb. During the low-level duration tb of the control signal VDO, the gate control signals AN4-AN6 as well as the bias control data RD, GD and BD, set to specific values, are supplied to the 3-state buffers 125a-125c from the display controller 113. In accordance with the control data RD, GD and BD, a signal with all "1" (high level) or all "0" (low level) is output as the data D1-D3. In this case, the control data RD, GD and BD may be set as shown in FIG. 17. More specifically, the data RD is pre-set so that D1-D3 are all "0" over the entire low-level duration tb of the control signal VDO, the data GD is preset so that D1-D3 are all "1" for a given period t1 and are all "0" for the remaining period, and the data BD is pre-set so that D1-D3 are all "1" for a period t2 longer than t1 and are all "0" for the remaining period. The bias interval of the liquid crystal display panel 115 is determined by the data D1-D3 in the bias period.

Consequently, the data D1-D3 from the data controller 111 are read by the segment driver 112 which in turn prepares the segment drive signals Y1-Ym. That is, the segment driver 12 (see FIG. 15 for its detailed illustration) transfers the data D1-D3 from the data controller 111 into the register 131 in synchronization with the sampling pulse $\phi$sm. The sampling pulse $\phi$sm ($\phi$s1, $\phi$s2, . . . , $\phi$sm), which is prepared by the sampling start signal $\phi$ST (see FIG. 18D) in association with the individual segment terminals, is output one pulse between the generation of the latch pulses $\phi$L after the data D1-D3 are transferred to the segment driver 112. This sampling pulse $\phi$sm permits the data D1-D3 to be sequentially transferred to those regions of the register 131 which are associated with the individual segment terminals. When the data D1-D3 are transferred to the register 131 at the preceding stage, the latch pulse $\phi$L is supplied to the latch circuit 132 so that the data held in the register 131 is latched in the circuit 132 and is then transferred to the pulse width modulation circuit 133.

Figures 18A, 18B, 18C, 18D, 18E, 18F, 18G:
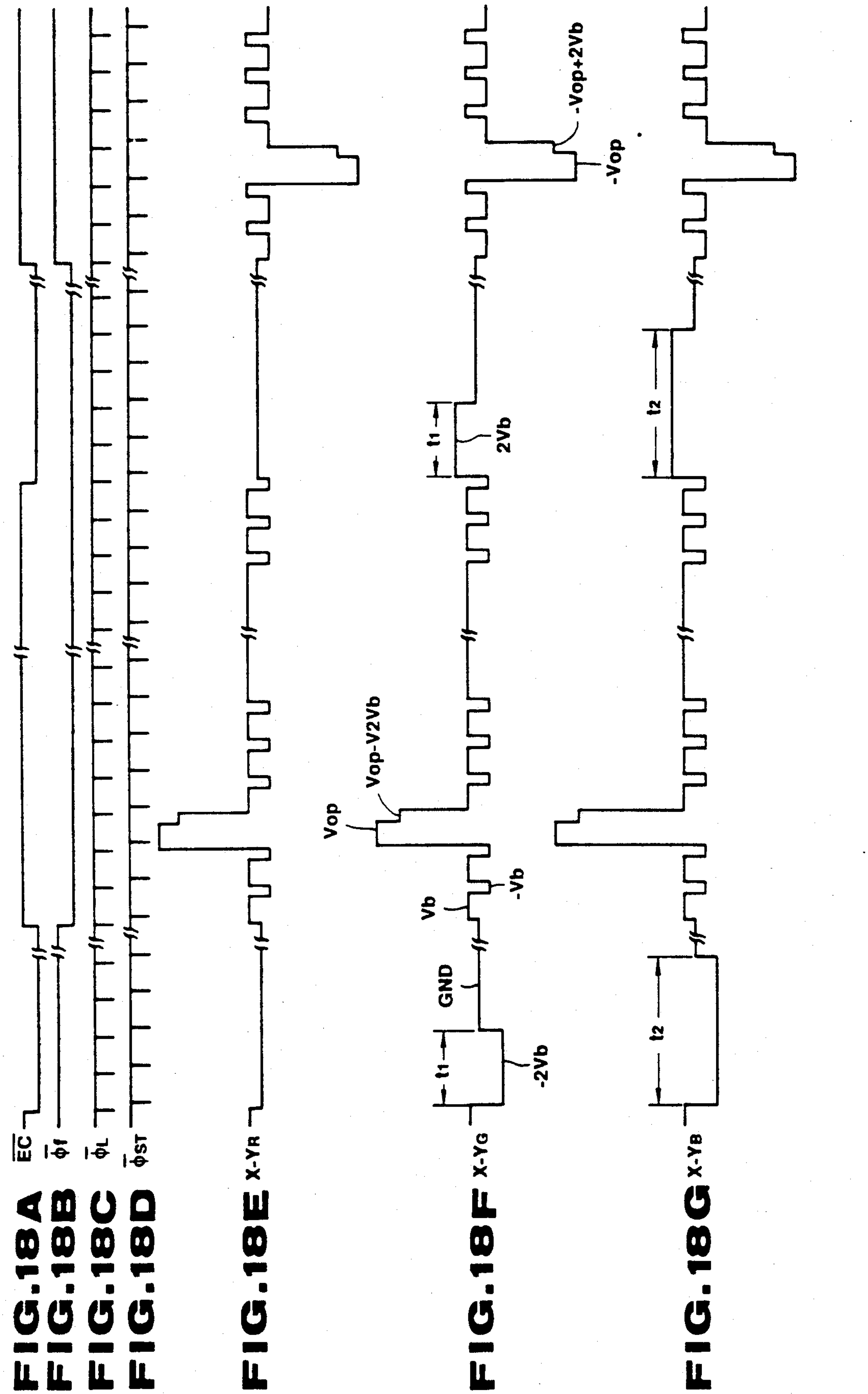

This pulse width modulation circuit 133 performs intensity modulation using the intensity modulation pulses P1-P3 in accordance with the latched data and prepares an 8-gradation signal. This gradation signal is inverted in synchronization with the frame signal $\phi$f and is output as the segment drive signal Ym through the level shifter 134 and inverter 135. In this case, the segment drive signals $Y_R$, $Y_G$ and $Y_B$ are prepared for the respective color signals R, G and B and drive the associated segment electrodes of the liquid crystal panel 115. The common electrodes of the liquid crystal panel 115 are driven by the common driver 116. X-$Y_R$, X-$Y_G$ and X-$Y_B$ in FIGS. 18E to 18G are the waveforms of the synthesized drive voltages between the common electrodes and segment electrodes (R, G and B) of the liquid crystal panel 115. The non-display period signal $\overline{EC}$ is set at a high level, that is, the segment drive signal based on the video data D1'-D3' is given during the video signal display period and the voltage level is V1 (vb) and V3 (−vb). With the common electrodes being selected, therefore, the synthesized drive voltages X-$Y_R$, X-$Y_G$ and X-$Y_B$ between the common and segment electrodes become "Vop" and "Vop-2vp" when the frame signal $\phi$f is at a high level and become "−Vop" and "−Vop+2vb" when the frame signal $\phi$f is at a low level. These synthesized drive voltages X-$Y_R$, X-$Y_G$ and X-$Y_B$ drive the liquid crystal panel 115.

During the non-display period T2 in which the non-display period signal $\overline{EC}$ is at a low level, the segment signal Ym based on the bias control data RD, GD and BD is output from the segment driver 112. When the frame signal $\phi$f is at a high level, therefore, the synthesized drive voltage X-$Y_R$ between the common and segment electrodes is kept at the GND level over the period T2. The synthesized drive voltage X-$Y_G$ is kept at the 2vb level for time t1 in the period T2 and is kept at the GND level for the remaining period. The synthesized drive voltage X-$Y_B$ is kept at the 2vb level for time t2 in the period T2 and is kept at the GND level for the remaining period. When the frame signal $\phi$f is at a low level, the drive voltages with their levels being inverted from those in the above case are applied between the common and segment electrodes.

In the manner described above, the bias voltage during the non-display period can be set sufficiently large by controlling the drive voltage for the common electrodes, the drive voltages for the R, G and B segment electrodes can be independently set and the birefringence $\Delta n$ of the liquid crystal element can be set at the optimum to provide the optimum value for $\Delta n \cdot d$ even if the thicknesses of the color filters differ from the optimum values.

Although a DC voltage is applied during periods t1 and t2 in FIGS. 18F and 18G, an AC voltage may be applied instead.

Although, according to the foregoing embodiments, a predetermined bias voltage is applied in the blanking period as the non-display period of an image signal, the predetermined bias voltage may be applied in a non-display period of an image signal which is provided in each selected period of the common electrodes.

Further, although bias driving is effected with effective voltage values which are mutually different for the respective colors of red, green and blue in the above embodiments, such bias driving may be effected with the effective voltage values at least two of which differ from each other.

What is claimed is:

1. A color liquid crystal display apparatus comprising:

color liquid crystal display means, having a plurality of common electrodes, a plurality of segment electrodes crossing said plurality of common electrodes and filters of three primary colors, for displaying a color image by means of a plurality of pixels through said filters; and drive means for driving said segment electrodes in a gradation according to an image signal having determined non-display periods, and for driving said common electrodes by a scan signal, said drive means including means for driving said segment electrodes in such a way as to provide, during a non-display period of said image signal, a no-bias period in which a voltage of said common electrodes is set equal to that of said segment electrodes to provide no-bias and which is for setting effective drive voltages of at least two of three types of pixels through said primary color filters different from each other during said non-display period of said image signal.

2. The apparatus according to claim 1, wherein said non-display period of said image signal is a blanking period.

3. The apparatus according to claim 1, wherein said non-display period of said image signal is a non-display period of said image signal during selection of said common electrodes.

4. The apparatus according to claim 1, wherein said drive means drives said segment electrodes to provide said no-bias period in such a way that said effective drive voltages of said three types of pixels through said primary color filters differ from one another.

5. The apparatus according to claim 1, wherein said drive means includes means for driving the common electrodes and segment electrodes in such a way that the no-bias period has different intervals between at least two of the three types of pixels.

6. The apparatus according to claim 1, wherein said drive means includes means for driving both the voltage to the common electrodes and that to the segment electrodes to 0 V during the no-bias period.

7. The apparatus according to claim 1, wherein said drive means includes means for driving the common and segment electrodes such that the voltage to the common electrodes is varied in accordance with the voltage to the segment electrodes during the no-bias period.

8. The apparatus according to claim 1, wherein said drive means includes means for driving the common and segment electrodes such that the voltage to the segment electrodes is varied in accordance with the voltage to the common electrodes during the no-bias period.

9. A color liquid crystal display apparatus comprising:

liquid crystal display means, having a plurality of common electrodes, a plurality of segment electrodes crossing said plurality of common electrodes and filters of three primary colors, for display a color image by means of a plurality of pixels through said filters; and drive means for driving said segment electrodes in a gradation according to an image signal having determined non-display periods, and for driving said common electrodes by a scan signal, said drive means including means for driving said segment electrodes in such a way as to provide, during a non-display period of said image signal, a no-bias period in which a voltage of said common electrodes is set equal to that of said segment electrodes and said common electrodes to provide no-bias and which is for setting effective drive voltages of at least two of three types of pixels through said primary color filters different from each other during said non-display period of said image signal.

10. The apparatus according to claim 9, wherein said non-display period of said image signal is a blanking period.

11. The apparatus according to claim 9, wherein said non-display period of said image signal is a non-display period of said image signal during selection of said common electrodes.

12. The apparatus according to claim 9, wherein said drive means drives said segment and common electrodes in to provide said no-bias period in such a way that said effective drive voltages of said three types of pixels through said primary color filters differ from one another.

13. A color liquid crystal display apparatus comprising:

a color display panel having common electrodes and segment electrodes arranged in a matrix form and red, green and blue color filters provided in association of said segment electrodes;

common electrode drive means for driving said common electrodes;

segment electrode drive means for driving said segment electrodes in a gradation according to an image signal having determined non-display periods; and potential setting means for allowing those of said segment electrodes which are associated with at least two of said red, green and blue colors, to have different effective voltages during a non-display period of said image signal and setting said common electrodes and said segment electrodes to have the same potential during a period in which said effective voltages provide an optimal $\Delta n \cdot d$ ($\Delta n$: birefringence) in accordance with a cell gap d on each of said segment electrodes.

14. The apparatus according to claim 13, wherein said potential setting means supplies said image signal to said segment electrode drive means during a display period of said image signal and supplies control data for specifying a period in which said common electrode and said segment electrodes are set to have the same potential, to said segment electrode drive means during said non-display period.

15. The apparatus according to claim 14, wherein said control data includes:

first control data for specifying a period in which that segment electrode which displays red is set to have the same potential as said common electrodes;

second control data for specifying a period in which that segment electrode which displays green is set to have the same potential as said common electrodes; and third control data for specifying a period in which that segment electrode which displays blue is set to have the same potential as said common electrodes.

16. The apparatus according to claim 13, wherein said potential setting means supplies said image signal to said segment electrode drive means during a display period of said image signal and supplies R, G and B gradation signals to said segment electrode drive means during said non-display period, at least two of colors of said gradation signals having different gradations.

17. The apparatus according to claim 13, wherein said potential setting means supplies said image signal to said segment electrode drive means during a display period of said image signal and supplies control data for specifying a period in which said common electrode and said segment electrodes are set to have the same potential, to said common electrode drive means and said segment electrode drive means during said non-display period.

18. A color liquid crystal display apparatus comprising:

a color liquid crystal display panel having color filters;

means for supply a color image signal having determined non-display periods;

signal generating means for generating a compensation signal for compensating a color balance of said color liquid crystal display panel; and drive means for driving said color liquid crystal display panel based on said color image signal during a display period of said color image signal and for driving said color liquid crystal display panel based on said compensation signal during a non-display period of said color image signal.

* * * * *

UNITED STATES PATENT AND TRADEMARK OFFICE

CERTIFICATE OF CORRECTION

PATENT NO. : 5,117 224

DATED : May 26. 1992

INVENTOR(S) : KAWAMURA et al

It is certified that error appears in the above-identified patent and that said Letters Patent is hereby corrected as shown below:

TITLE PAGE:

Section [56] References Cited - under "U.S. Patent Documents", insert

--4,390,874 6/1983 R.H. Woodside......340/784
4,952,032 8/1990 H. Inoue et al.....350/331T--

Signed and Sealed this

Twenty-sixth Day of October, 1993

Attest:

BRUCE LEHMAN

*Attesting Officer* *Commissioner of Patents and Trademarks*